G. C. BIDDLE & E. R. BUYS.
CORE.
APPLICATION FILED JULY 23, 1912.
1,116,550.
Patented Nov. 10, 1914.
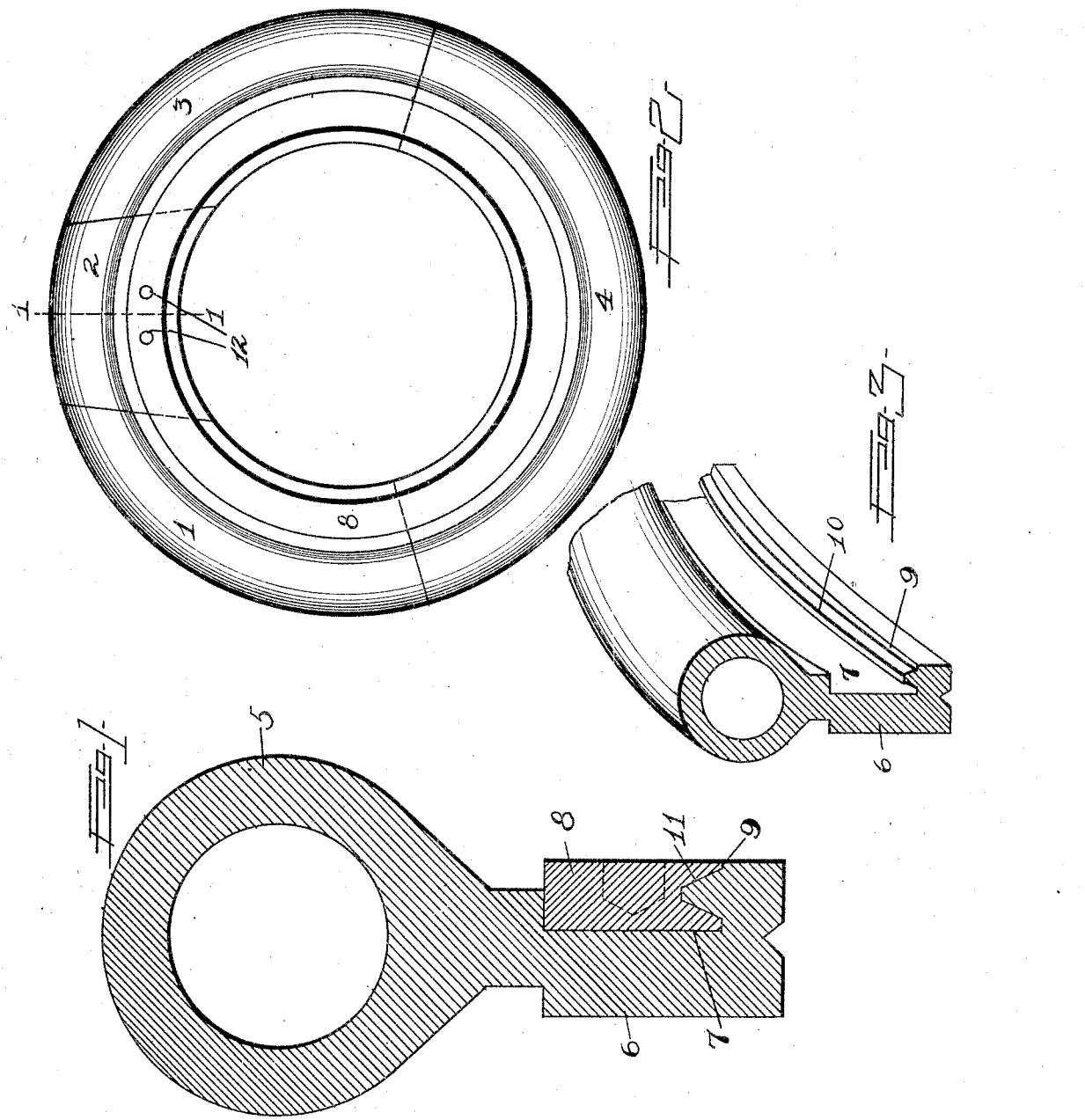
Witnesses
J. N. Lyle.
C. L. Schmidt
Inventors
George C. Biddle and
Earl R. Buys.
By Shepherd & Campbell
Attorneys

UNITED STATES PATENT OFFICE.

GEORGE C. BIDDLE AND EARL R. BUYS, OF AKRON, OHIO.

CORE.

1,116,550.  Specification of Letters Patent.  Patented Nov. 10, 1914.

Application filed July 23, 1912. Serial No. 711,095.

*To all whom it may concern:*

Be it known that we, GEORGE C. BIDDLE and EARL R. BUYS, citizens of the United States of America, residing at Akron, in the county of Summit and State of Ohio, have invented certain new and useful Improvements in Cores, of which the following is a specification.

This invention relates to a core adapted for use in making pneumatic tires.

Automobile tires are built on a cast iron form or core, after which the tire is placed in a mold and cured, said core maintaining the tire solidly and centrally in the mold. After the tires are cured, or finished, it is necessary to remove the core from the tire. A number of cores have been devised made in sections and arranged to be taken apart when it is desired to remove the tire from the core.

The present invention comprises substantially a structure of this character. That is, it comprises a core made of a plurality of sections, together with means for readily locking all of said sections together or for separating said sections when it is desired to remove the tire.

In the accompanying drawings Figure 1 is a transverse section of a portion of a core constructed in accordance with the invention, said section being taken upon line 1—1 of Fig. 2. Fig. 2 is a side elevation thereof, and Fig. 3 is a detailed perspective view of a portion of one of said sections.

Like numerals designate corresponding parts in all of the figures of the drawing.

The core is made up of a plurality of sections 1, 2, 3 and 4. It will be noticed that the section 2 is of wedge form. These sections are brought together end to end until they form a complete circular core. It will be noticed that the sections comprise the body portions 5 and the web portions 6. These web portions are provided with a continuous facial recess 7 adapted to receive a locking ring 8. The inner peripheral wall 9 of these facial recesses is provided with a rib 10, said rib forming a screw thread with which the inner peripheral edge of locking ring 8 engages, as is illustrated at 11 in Fig. 1. The locking ring is provided with openings 12 for the reception of a spanner wrench or like tool to permit of the ready turning of the ring. When it is desired to build the tire, the parts and sections 1, 2, 3, and 4 are brought together end to end and the locking ring is engaged with the screw thread formed by the complemental ribs 10 and the ring is turned to cause it to bottom in the facial recess 7. This locks all of the sections together, as will be readily understood. When it is desired to remove the core from the tire, it is only necessary to impart a reverse movement to the ring, and to remove said ring from the recess 7. A smart blow upon section 2 will then cause said section to move inwardly, and the core may be readily taken out of the tire section by section.

We are aware of the fact that cores made up of a plurality of sections have been employed, but these several sections have heretofore been secured together by nuts and bolts, or transverse fastening devices. It will be seen that the present invention comprises a single locking member and that it is only necessary to turn this single locking member to lock all of the sections together, and it will also be seen that the actuation of this single locking member will be very easy, because the thread formed by ribs 11 is a comparatively quick one and it requires only one rotation of locking ring 8 to cause it to bottom in recess 7.

It will be seen that the formation of the recess between the outer peripheral wall 14 and the inner peripheral wall 9 locates ring 8 in such a position as to prevent radial movement of any of the sections in either direction.

From the foregoing description it will be seen that simple and efficient means are herein provided for accomplishing the objects of the invention, but while the elements shown and described are well adapted to serve the purposes for which they are intended, it is to be understood that the invention is not limited to the precise construction set forth, but includes within its purview, such changes as may be made within the scope of the appended claims.

Having described our invention, what we claim is:—

1. A core for tires comprising a plurality of sections, each of said sections comprising a body portion and a web portion, an arcuate facial recess formed in one side of each of said web portions and extending from end to end thereof, there being a screw thread formed complementally in the recessed portions of the several sections and a locking ring adapted to have engagement with said screw thread whereby when said locking ring is turned to cause it to travel over said screw thread, all of said sections will be engaged by said ring and said ring will be caused to enter said facial recess.

2. A core for tires comprising a plurality of sections, each of said sections comprising a body portion and a web portion, an arcuate facial recess formed in one side of each of said web portions and extending from end to end thereof, there being a screw thread formed complementally in the recessed portions of the several sections and a locking ring adapted to have engagement with said screw thread whereby when said locking ring is turned to cause it to travel over said screw thread, all of said sections will be engaged by said ring and said ring will be caused to enter said facial recess, the inner and outer walls of said recess overlapping respectively, the inner and outer peripheries of said ring.

In testimony whereof we affix our signatures in presence of two witnesses.

GEORGE C. BIDDLE.
EARL R. BUYS.

Witnesses:
ELIZABETH WALTERS,
H. H. WALTERS.

Copies of this patent may be obtained for five cents each, by addressing the "Commissioner of Patents, Washington, D. C."